April 21, 1964

C. S. MANNING 3,130,263

COLOR DISPLAY SYSTEM

Filed Aug. 22, 1961

2 Sheets-Sheet 1

INVENTOR.
CHARLES S. MANNING
BY

ATTORNEYS

April 21, 1964 C. S. MANNING 3,130,263

COLOR DISPLAY SYSTEM

Filed Aug. 22, 1961 2 Sheets-Sheet 2

INVENTOR.
CHARLES S. MANNING

BY

ATTORNEYS 3,130,263

COLOR DISPLAY SYSTEM

Charles S. Manning, 3454 Bangor Place, San Diego 6, Calif.

Filed Aug. 22, 1961, Ser. No. 133,275
2 Claims. (Cl. 178—5.4)
(Granted under Title 35, U.S. Code (1952), sec. 266)

The invention described herein may be manufactured and used by or for the Government of the United States of America for governmental purposes without the payment of any royalties thereon or therefor.

This invention pertains to multi-color display systems. In one specific aspect, it relates to a color television receiver.

Often, a color television receiver employs a three-gun cathode ray tube to produce the television image. The three-gun cathode ray tube employed in color television receivers distinguishes from the monochrome picture tube by more than just the addition of two extra electron guns. The three-gun color picture tube not only contains additional components, it requires additional external circuitry which is unnecessary for monochrome picture tubes.

Wherein the interior surface of the image wall of a monochrome picture tube is covered with a continuous coating of one phosphor that luminesces when bombarded with electrons, the interior surface of the image wall of a three-gun tube is covered with a plurality of minute phosphor dots. Three types of phosphors are used for the dots; red-light emitting, green-light emitting and blue-light emitting. The dots are attached to the tube wall in non-overlapping fashion in triangular clusters, each cluster containing three dots and each dot being of a different phosphor. The clusters are interlaced so that a dot of one phosphor does not abut another dot of the same phosphor.

The three phosphor dots in a triangular cluster are each simultaneously bombarded by electrons, one electron gun bombarding each dot. The electrons directed from one gun toward one dot should not strike another dot. The following internal and external apparatus is relied on to maintain static and dynamic convergence of the three electron beams so they strike the proper dots at the proper time: convergence pole pieces, convergence electrodes, convergence circuit, shadow mask and purity coil. This apparatus is not needed with monochrome picture tubes.

As the shadow mask prevents many of the emitted electrons from reaching the phosphor dots, a high-voltage supply approximately twice that required with a monochrome picture tube is needed in the three-gun color picture tube.

The three-gun color tube is lengthy and cannot be installed in a shallow cabinet. In very confined quarters such as the cockpit of a space vehicle there is often insufficient room for mounting a lengthy cathode ray tube in front of the passenger.

It is an object of this invention to provide a display system for producing images in color.

It is an object of this invention to provide a television receiver with a shallow viewing screen.

It is an object of this invention to provide a television receiver with means for magnifying the image without the use of lenses, mirrors or a combination thereof.

It is still another object of this invention to provide a color television receiver without the use of a three-gun picture tube.

Other objects and advantages of the invention will be apparent from a study of the following specifications, read in connection with the accompanying drawings wherein.

Figures 1, 2:
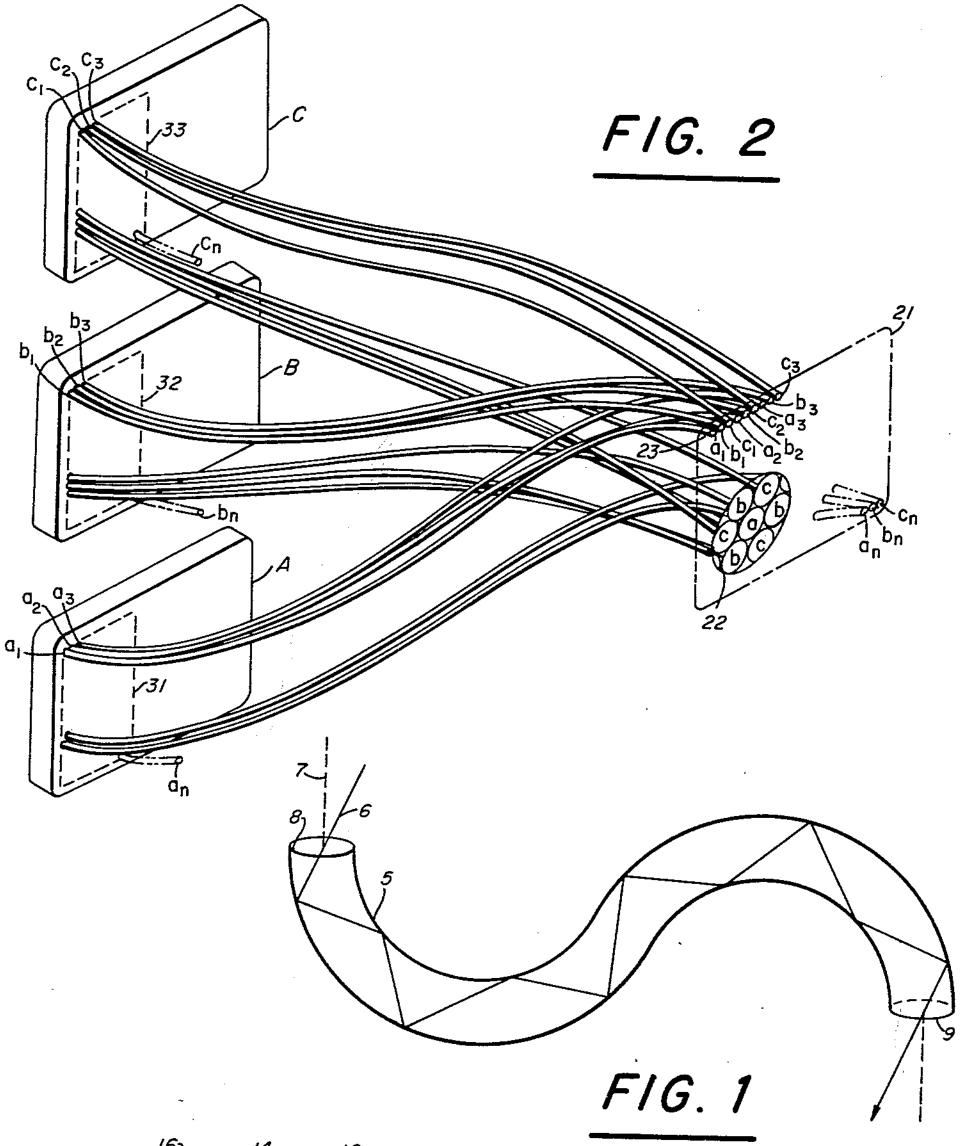
FIG. 1 is a pictorial diagram of a light transmitting rod or filament.
FIG. 2 is a pictorial diagram of monochrome picture tubes and flexible transparent fibers.

If light impinges on one end of a transparent rod, much of the light that enters the rod will escape the other end of the rod because of internal reflection in the rod. A beam of light entering the rod at an angle with respect to the longitudinal axis of the rod will be internally reflected repeatedly by the wall of the rod until the beam emerges at the other end of the rod. If the ends of the rod are cut at an angle 90 degrees to the longitudinal axis of the rod, and the rod is not tapered, light impinging at one end of the rod at an oblique angle will emerge from the other end of the rod at the same oblique angle. The same phenomenon occurs when the rod is bent or when the rod is very small in diameter. When the diameter of the rod approaches the wavelength of light the phenomenon no longer occurs. A transparent rod or filament 5 bent in the form of an S is illustrated in FIG. 1. A light ray 6 entering the rod obliquely to longitudinal axis 7 at end 8 emerges from end 9 after making a plurality of reflections from the inner wall of the rod.

FIG. 2 illustrates multi-colored image producing apparatus in accordance with the invention. The interior surfaces of the image-producing walls of cathode ray tubes A, B, and C are each coated with a continuous coating of a different phosphor so that each tube produces a different color image when bombarded with electrons. The phosphors used in picture tubes A, B and C may be, for example, red-light emitting, blue-light emitting and green-light emitting. The spaghetti-like members $a_1$, $b_1$, $c_1$ and so forth are flexible, transparent, rods, filaments or fibers which internally reflect light as does filament 5 shown in FIG. 1.

Figure 3:
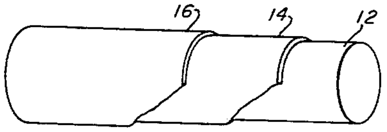
FIG. 3 is a pictorial diagram of a single fiber.

Flexible fibers $a_1$, $b_1$, $c_1$ and so forth illustrated in FIG. 2 are identical in structure. FIG. 3 shows a cross-sectional view of one of the fibers. The fiber comprises a transparent, image transporting core 12 and one or more coatings. Coating or layer 14 is a thin film of transparent material having an index of refraction lower than that of inner core 12. This coating reduces light leakage from one fiber to another and protects the wall of the fiber where the internal reflection takes place. The difference in index of refraction between the core 12 and coating 14 need be very slight to trap light within the core and keep it from penetrating the coating. The core 12 preferably has a high internal homogeneity and a very smooth skin. Coating or jacket 14 should wet the surface of the core and form a tight bond with the core. The core may be formed in known manner from any one of various transparent materials, for example, optical glass such as flint glass. The coating 14 that surrounds the core may be any one of a number of transparent materials having a lower index of refraction than that of the fiber, for example, methyl methacrylate.

Layer or jacket 14 of the fibers may be coated with an additional thin coating 16 that is light absorbing to provide further insurance against light leakage from one fiber to another. In addition to being light absorbing this coating may also be a binder and be used to bond the fibers into bundles at their extremities.

The fibers shown in FIG. 1 extend from the image producing faces of picture tubes A, B, and C to plane 21. There at plane 21 the extremities of the fibers are interwoven into parallel rows and oblique columns so as to form a viewing screen. See magnified view 22 in FIG. 2. Fibers terminating in plane 21 assume the same correlative vertical position there that they assume at the faces of the tubes. That is, fibers maintaining top-row positions at tubes A, B and C all maintain top-row positions at plane or viewing screen 21, and all fibers maintaining bottom-row positions at tubes A through C all maintain bottom-row positions at plane 21. There is a similar correlation of the horizontal position of the fibers. The fibers in row 23 are arranged left to right as follows: $a_1$, $b_1$, $c_1$, $a_2$, $b_2$, $c_2$, $a_3$, and so forth. This repetitive arrangement of fibers causes any one fiber to be surrounded by fibers from the other two picture tubes and prevents two fibers from one tube from abutting one another. This arrangement of fibers at viewing screen 21 produces a threefold magnification in the horizontal dimension of the screen. There is no similar threefold magnification in the vertical dimension of the viewing screen. To compensate for the uneven magnification, the horizontal deflection systems (not shown) of tubes A, B and C are adjusted so that the raster within each tube only sweeps one-third the distance across the face of the tube. Accordingly, the images at the tube faces are compressed to one-third their regular size in the horizontal direction so that the image appears normal when viewed at screen 21. The aspect ratio of viewing screen 21 is the same as the aspect ratio of the viewing face of either tube A, B or C. At tube A, fibers $a_1$–$a_n$ are employed to cover one-third the area of the tube face; at tube B, fibers $b_1$–$b_n$ are employed to cover one-third the area of the tube face; and at tube C, fibers, $c_1$–$c_n$ are employed to cover one-third the area of the tube face. Broken lines 31–33 delineate the fiber boundaries on the picture tube faces. Obviously tubes A, B, and C can be manufactured having an aspect ratio one-third that of viewing screen 21 i.e. viewing screen 21 would then have three times the area of the face of tubes A, B, or C. In this case tubes A, B, and C, will have an aspect ratio of one-third the aspect ratio of the picture being reproduced. The aspect ratio being defined as the ratio of horizontal dimension to vertical dimension.

As an alternative method of color display, full, normal images may be displayed on tubes A through C, however; the faces of tubes A through C must be entirely covered with optical fibers and the horizontal rows of fibers at viewing screen 21 must be spaced two fiber thicknesses apart so as to compensate for the inherent thereefold magnification in the horizontal dimension of the viewing screen. A potting material, for example, may be used to support and separate the horizontal rows of fibers.

The bundles of fibers terminating at picture tubes A, B and C and at plane 21 may be held together in a number of various ways. For example, the fiber extremities may be coated with a coating having a lower softening point than the fiber so that the coating will fuse the fibers together when heated; or the ends of fiber may be imbedded in a plastic; or the fibers may be mechanically clamped together. The fibers may be assembled first in intermediate size bundles and then later grouped to form the final bundles.

The fiber bundles terminating at the faces of the picture tube are cut so as to conform to the contour of the tube surface and they are optically polished so as to readily accept light incident thereon from the phosphor coating within the tube. The fibers terminating in plane 21 are also optically polished to form a planar image viewing screen.

Monochromatic images produced at picture tubes A, B and C are picked up stimultaneously by fibers $a_1$–$a_n$, $b_1$–$b_n$ and $c_1$–$c_n$ and transmitted without parallax to plane 21 where they may be viewed by an observer, photographed and so forth. The fibers are made sufficiently thin so that the end of each threesome of adjacent fibers, containing one "*a*" fiber, one "*b*" fiber and one "*c*" fiber, is seen as a single color due to color addition. The resultant mixed color is dependent upon the wavelength and intensity of light travelling in each fiber in the threesome. When three colors are added, the widest range of colors is produced when red, blue and green "primary" colors are employed. These three colors are the same primary colors used in the NSTC color television system. Thus, in the instant apparatus the widest range of colors can be produced at viewing screen 21 if red, blue and green light-emitting phosphors are used in tubes A, B and C, respectively. Other types of phosphors may be used of course. As an alternative, tubes A, B and C may all be black-and-white picture tubes and the fibers abutting each individual tube may be tinted different colors.

The resolution required in the image produced on the viewing screen dictates the size of the transparent fibers employed. If a fiber is tapered, the light beam transmitted in it will be concentrated or expanded depending on the direction of travel within the fiber. The image produced at the viewing screen may thus be magnified or demagnified by employing conically rather than cylindrically shaped fibers.

When an election beam impinges on the phosphor coating in a picture tube, light is scattered at different angles from the coincident spot on the face of the tube. The light radiating obliquely from the face of the tube does not reach the observer's eye if the eye is on a line perpendicular to the spot. An advantage of the instant invention is that the fibers abutting the face of the picture tube scavenge the obliquely radiated light rays and channel them to the other end of the fiber by means of internal reflection.

Figure 4:
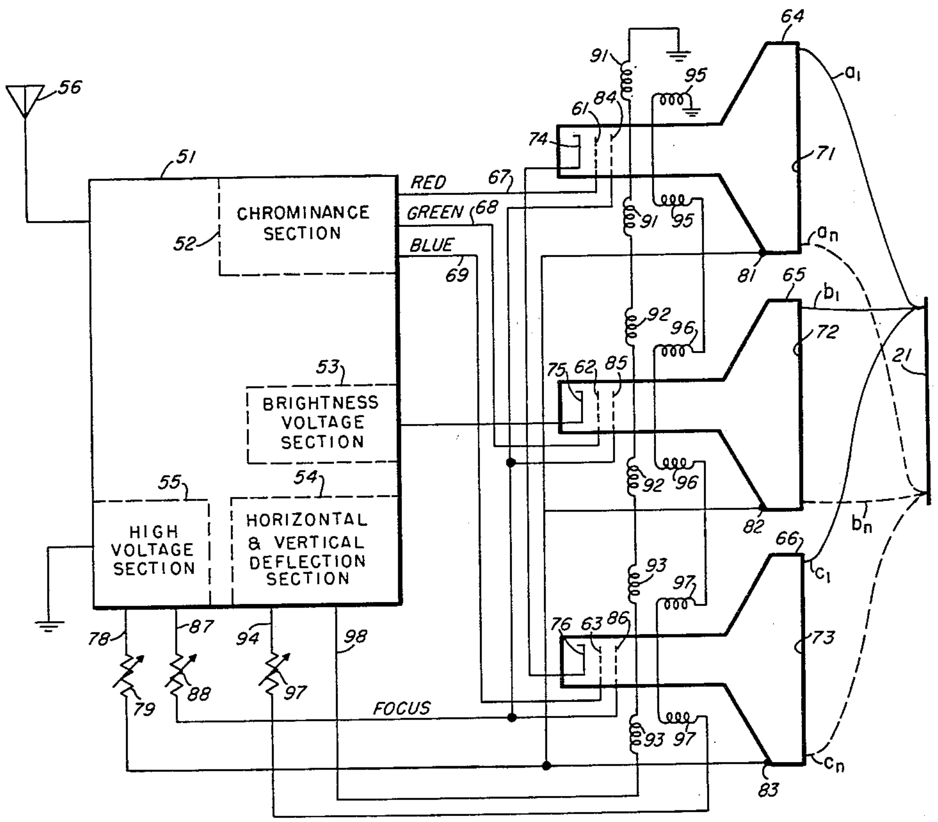
FIG. 4 is a schematic diagram of a color television receiving system.

FIG. 4 illustrates a color television receiving system in accordance with the invention. The receiver 51 is a conventional color television receiver which has been modified by the removal or abandonment of the three-gun cathode ray tube and the convergence apparatus for same. Television signals are picked up by antenna 56 and fed into receiver 51. The red, green and blue color signals produced by chrominance section 52 of the receiver are fed to grids 61–63 of cathode ray tubes 64–66, respectively, by means of leads 67–69, respectively. Cathode ray tubes 64–66 are ordinary monochrome tubes having red, green and blue light-emitting phosphors 71–73, respectively. The brightness voltage produced by the brightness section of the receiver is fed simultaneously to cathodes 74–76 of tubes 64–66, respectively.

Shadow masks used in color tubes may intercept 85 percent of the electrons in the scaning beams. To overcome the resulting loss in screen brightness due to this interference of the electron beams, higher anode voltages are often employed in color tubes than in monochrome tubes. The anode high voltage is removed from high voltage section 55 by means of lead 78 and fed in parallel to anodes 81–83 of cathode ray tube 64–66, respectively. Adjustable attenuator 79 enables the anode voltage to be varied. The focus voltage is removed from high voltage section 55 by means of lead 87 and fed in parallel to focus electrodes 84–66 of picture tubes 64–66, respectively. Variable attenuator 88 enables the focus voltage to be adjusted to suit the monochromatic tubes.

The horizontal deflection voltage from deflection voltage section 54 of receiver 51 is fed to horizontal deflection coils 91–93 of tubes 64–66, respectively, by means of lead 94. The vertical deflection voltage from deflection voltage section 54 is serially fed to vertical deflection coils 95–97 of picture tubes 64–66 by means of lead 98. Variable attenuator 99 in the horizontal deflection output lead is adjusted so as to cause the electron beam in each picture tube to sweep only one-third the distance across the face of the screen.

This arrangement causes the television picture to be produced simultaneously on the faces of all three cathode ray tubes, however; the image on the face of tube 64 is red, the image on the face of tube 65 is green and the image on the face of tube 66 is blue. The brilliance of the images on the tube faces will vary directly in accordance with the amplitude of their respective chrominance signals. That is to say, the brilliance of the red image on the face of picture tube 64 will be heightened when the red chrominance signal on lead 67 increases amplitude; the brilliance of the green-hued image on the face of cathode ray tube 65 will be increased when the green chrominance signal on lead 68 increases in amplitude; and so forth.

Flexible fibers $a_1$–$a_n$, $b_1$–$b_n$ and $c_1$–$c_n$ are constructed and arranged the same as the fibers in the apparatus illustrated in FIG. 2 so as to transport the monochromatic images from the faces of tubes 64, 65 and 66 to viewing screen 21. In the drawing the viewing screen is shown close to the picture tubes and parallel to the faces of the tubes. It should be appreciated that the fibers can be extended to allow remote viewing and that the viewing screen can be tilted at any desired angle.

The multi-colored display apparatus revealed in FIG. 2 is adapted to display images other than television pictures. For example, circularly-faced cathode ray tubes may be used for cathode ray tubes A, B and C and PPI-type deflection circuits may be used therewith to present information obtained from detection equipment such as, for example, radar, sonar or infrared. The apparatus may, for example be utilized in a pictorial display radar navigation system.

A map of the radar-scanned terrain could be reproduced in a first color, friendly aircraft or vehicles could be displayed in a second color and hostile aircraft or vehicles could be reproduced in a third color.

Although three monochrome picture tubes are used in the apparatus illustrated in FIG. 2 it should be appreciated that either fewer or more tubes may be employed.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. In combination with display apparatus for displaying images having a predetermined aspect ratio first, second and third screens wherein a different colored image is produced on each screen, a plurality of small thin, flexible, light-conductive filaments, said filaments having a transparent core of refractive material and a thin transparent outer jacket of refractive material, said index of refraction of said core being higher than said index of refraction of said outer jacket, said filaments being divided into first, second and third groups, each of said filaments having a first and second end, said first ends of said filaments in said first group being in optical contact with said first screen and arranged to cover said image produced thereon, said first ends of said filaments in said second group being in optical contact with said second screen and arranged to cover said image produced thereon, said first ends of said filaments in said third group being in optical contact with said third screen and arranged to cover said image produced thereon, said second ends of said filaments being disposed in adjacent rows and contained within a single plane, said different colored images having an aspect ratio of one-third of said predetermined aspect ratio and said second ends of said filaments forming a viewing screen having said predetermined aspect ratio.

2. In combination with display apparatus having N cathode ray picture tubes wherein a different colored image is displayed on the face of each picture tube, a large number of very small, flexible, transparent filaments, said filaments being light-conductive and having first and second ends, said filaments being divided into N groups, said first ends of said filaments in each group being in optical contact with the face of one of said picture tubes, the picture tube face area covered by each group of filaments being coextensive with the area of said image produced at each picture tube, said second ends of all of said filaments being disposed in adjacent rows and in a single plane so as to form a viewing screen with a planar face, said different colored images having an aspect ratio of 1/N of a predetermined aspect ratio and said viewing screen having said predetermined aspect ratio.

References Cited in the file of this patent

UNITED STATES PATENTS

| | | |
|---|---|---|
| 2,510,106 | Henroteau | June 6, 1950 |
| 2,825,260 | O'Brien | Mar. 4, 1958 |
| 2,967,664 | Ress | Jan. 10, 1961 |
| 3,043,179 | Dunn | July 10, 1962 |
| 3,043,910 | Hicks | July 10, 1962 |